US007071481B2

(12) United States Patent
Nekrasov et al.

(10) Patent No.: US 7,071,481 B2

(45) Date of Patent: Jul. 4, 2006

(54) AUTOMATED REAGENTLESS SYSTEM OF PRODUCT FINGERPRINT AUTHENTICATION AND TRADEMARK PROTECTION

(75) Inventors: Victor V. Nekrasov, Moscow (RU); Rem Lazarenko-Manevich, Obinsk (RU); Jafar R. Gasanov, Moscow (RU); Alexander T. Portyan, Moscow (RU); Natalia V. Ryzhakova, Moscow (RU); Yevgeny B. Brik, Obinsk (RU); Vladimir R. Lazarenko-Manevich, Moscow (RU); Igor V. Fetisov, Kubonskaya street., 26-2, sq. 68, Moscow (RU) 105345; Oleg Lagutenko, Aventura, FL (US)

(73) Assignee: Igor V. Fetisov, Moscow (RU)

( * ) Notice: Subject to any disclaimer, the term of this patent is extended or adjusted under 35 U.S.C. 154(b) by 273 days.

(21) Appl. No.: 10/681,135

(22) Filed: Oct. 9, 2003

(65) Prior Publication Data

US 2005/0077488 A1 Apr. 14, 2005

(51) Int. Cl.
*G06K 7/10* (2006.01)

(52) U.S. Cl. ......................... 250/566; 702/28; 356/301

(58) Field of Classification Search ................ 250/566, 250/573–576; 356/301; 702/28
See application file for complete search history.

(56) References Cited

U.S. PATENT DOCUMENTS

| | | | | |
|---|---|---|---|---|
| 4,620,284 A * | 10/1986 | Schnell et al. | ................ | 702/28 |
| 6,232,124 B1 * | 5/2001 | Selinfreund | .................. | 436/20 |

* cited by examiner

*Primary Examiner*—Thanh X. Luu
(74) *Attorney, Agent, or Firm*—Browdy and Neimark, PLLC

(57) ABSTRACT

A certification, marking and automated nondestructive product authentication system that identifies a specific manufacturer's product at all states of sale. The system detects counterfeit products and/or product contamination with alien admixtures. The system uses spectral analysis method to produce a card creating image, signature, fingerprints, and/or data profiles that unambiguously characterize the product of specific manufacturers and provide secure trademark protection. The system allows contact-free control of a packaged product without breaking the integrity of the original manufacturer's packaging, which is achieved by using special material for package fabrication or by equipping the package with a special device made of such material.

10 Claims, 5 Drawing Sheets

AUTOMATED REAGENTLESS SYSTEM OF PRODUCT FINGERPRINT AUTHENTICATION AND TRADEMARK PROTECTION

FIELD OF THE INVENTION

The present invention relates to the field of identifying the component compositions of products and, more particularly, for automatically identifying products and detecting counterfeits. This invention is also related to automated product identification and protection of formulations of commercial product trademarks and brands.

BACKGROUND OF THE INVENTION

The production and sale of illegal products causes huge commercial losses. Today, the revenues generated by counterfeit products are comparable to the revenues from drug trafficking and arms sales. [Independent study: www.ntv.tv.ru, November, 2002]. Furthermore, counterfeit products, which are often made from haphazard raw materials that produce inferior and possibly dangerous products, discredit the trademark of honest manufacturers and create a potential threat to human life and health.

In recent years, the huge growth in counterfeit products has resulted in the rapid development of various technologies whose aim is to protect the reputation of the manufacturers [Pan European Forum for Auto ID Community, 2003, http://www.global-id-magazine.com/0303/250303.pdf; http://www.ean.ru]. Huge amounts of money are spent nowadays to develop unique containers and labels, bar codes, etc. with the aim of protecting the products and trademarks of honest manufacturers. However, those measures are merely external attributes that are not confirmed by their unambiguous and convincing correlation with the qualitative/quantitative characteristics of the product being protected or with the unique technology used by a specific manufacturer [Barcodes EAN/UPC: Automatic Identification Association UNISCAN: www.ean.ru; Universal Product Code (UPC) and EAN Article Numbering Code (EAN): www.adams1.com/pub/russadam/upccode.html], and therefore they are not reliable enough protection tools.

These circumstances have focused strong interest on identification methods that permit the rapid and confident determination and documentation of whether a product belongs to a specific manufacturer based on an instrumentally controlled set of features that reflect the nature of the raw materials and production technology.

The component composition of a product is a natural set of such features. In this case, the information about the fine differences between products due to the raw materials and production technology of each specific manufacturer is carried by the unique set of trace amounts of microimpurities [Oshurko V. B., Karpyuk A. B., Melekhov A. P. *Proceedings of the Third Scientific and Practical Conference, "Quality Identification and Safety of Alcoholic Products*," Pushchino, Moscow Region, 2001, p. 92]. Therefore, almost all product identification techniques are based on methods of determining and detecting trace amounts of substances (trace analysis).

The overwhelming majority of the traditional analytical technologies used to accomplish trace analysis require some preliminary preparation and/or enrichment of the sample to be analyzed [Beyermann K., *Organic Trace Analysis*. Georg Thieme Verlag, Stuttgart and N.Y., 1982]. This leads to inevitable experimental errors that decrease the reproducibility of the analytical results [Belyanina V. V., Petov A. P. *Proceedings of the Third Scientific and Practical Conference, "Quality Identification and Safety of Alcoholic Products*," Pushchino, Moscow Region, 2001, p. 46; Sharykina A. V., Petrov A. P., Pomazanov V. V., Ibid., p. 133], which makes it impossible to make an unambiguous identification of items being compared.

Obviously, direct methods that do not require any sample preparation and eliminate or properly minimize errors and afford a high level of reproducibility of analytical results are required for the purposes of identification. The use of such methods provides for a quantitatively different level of product protection that practically excludes any unauthorized use of identification attributes of a trademark and prevents any penetration of counterfeit products into the market.

SUMMARY OF THE INVENTION

It is an object of the present invention to overcome the aforesaid deficiencies in the prior art.

It is another object of the present invention to create a process of card generation and product labeling that will provide a rapid method for reagent-free inspection and authentication of products at all steps of their sale.

It is another object of the present invention to create a highly effective system for protecting the trademark of a commercial product.

It is a further object of the present invention to increase the degree of protection of a product's universal insignificant identifying features (such as barcodes).

It is yet another object of the present invention to provide a rapid method for identifying counterfeit products.

It is still another object of the present invention to provide a method for identifying authentic products.

The present invention protects the identity of products by using generalized multidimensional optical images that reflect the integrated component composition of a product and are formed from absorption, spectral/luminescent and Raman spectra of analyzed products based on an instrumentally measurable integrated response of the analyzed product to incident light for card generation and product inspection.

A fingerprint is obtained for a known product based upon absorption, spectral/luminescent, and Raman spectra of the known product. This fingerprint, which can be recorded by a special apparatus as a multidimensional matrix, can be in the form of a card that unambiguously reflects the product's composition. That information can be presented as a graphic or digital document affixed directly to the container of the product. Alternatively, the fingerprint can be stored in a centralized database. Containers for the product are designed so that the fingerprint can be obtained for an unknown product in the same manner as for the known product. Once the fingerprint of the unknown product is obtained, it is compared with the fingerprint of the known product to ascertain whether the unknown product is an authentic product or is a counterfeit.

a) as a 3D image;

b) as a "fingerprint."

Figure 2:
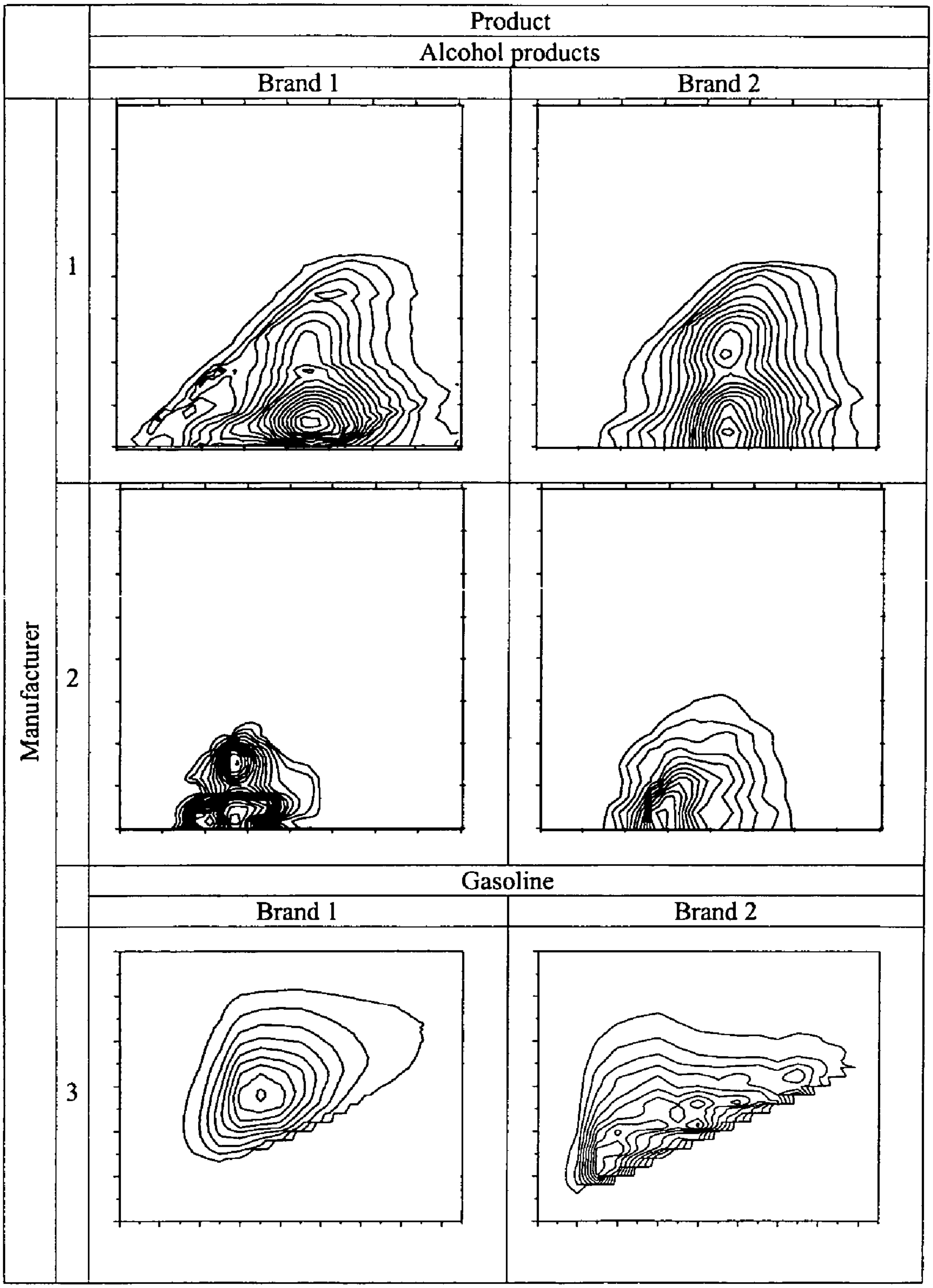

FIG. 2 is a graphic of generalized optical images of similar products of different brands and manufacturers.

Figure 3:
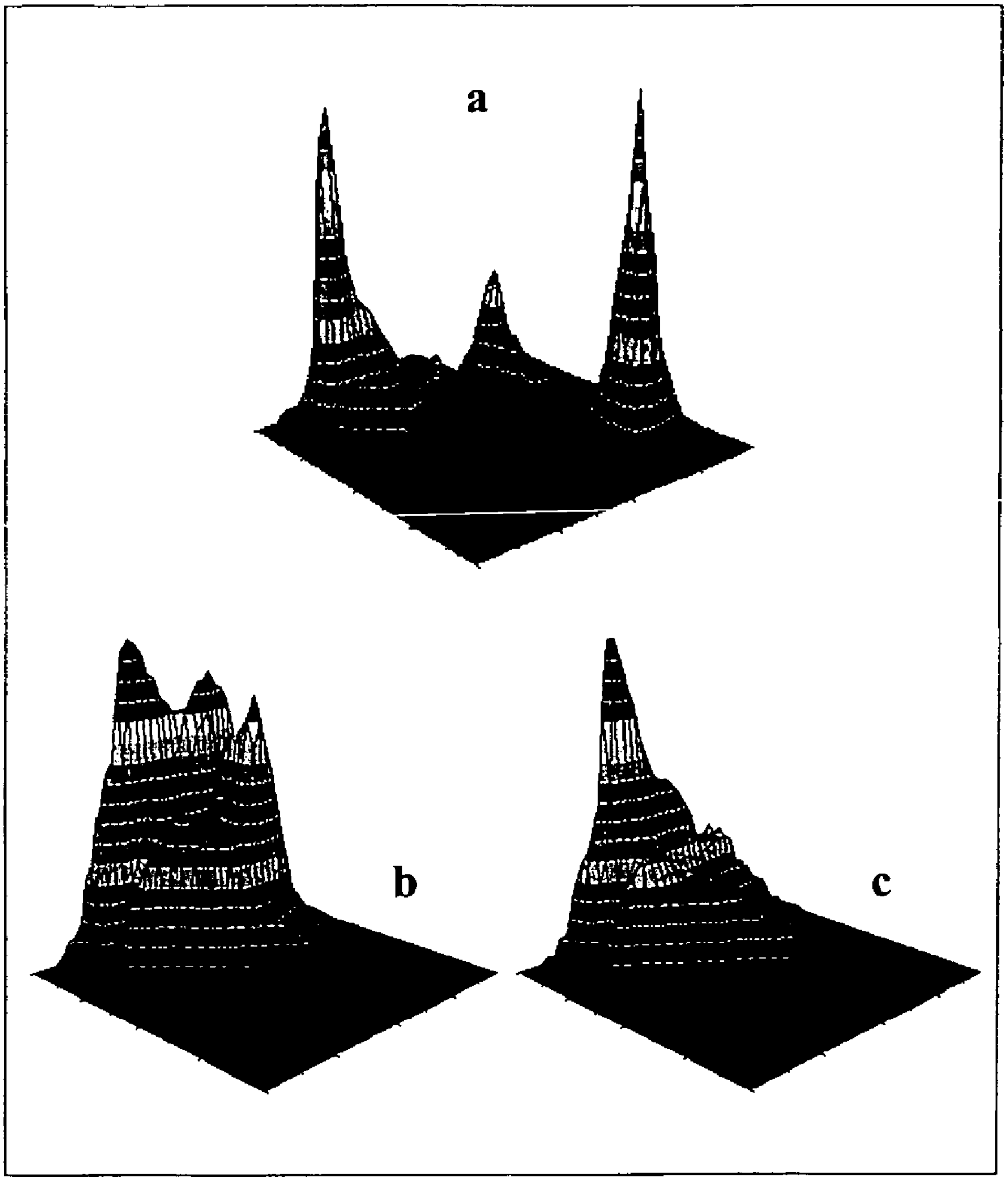

FIG. 3 is a three dimensional graphic of generalized optical images of a household dish detergent:

FIG. 3*a*) corresponding to the product covered by the claimed trademark;

FIGS. b) and c) are graphics of counterfeit products made by various manufacturers.

Figure 4:
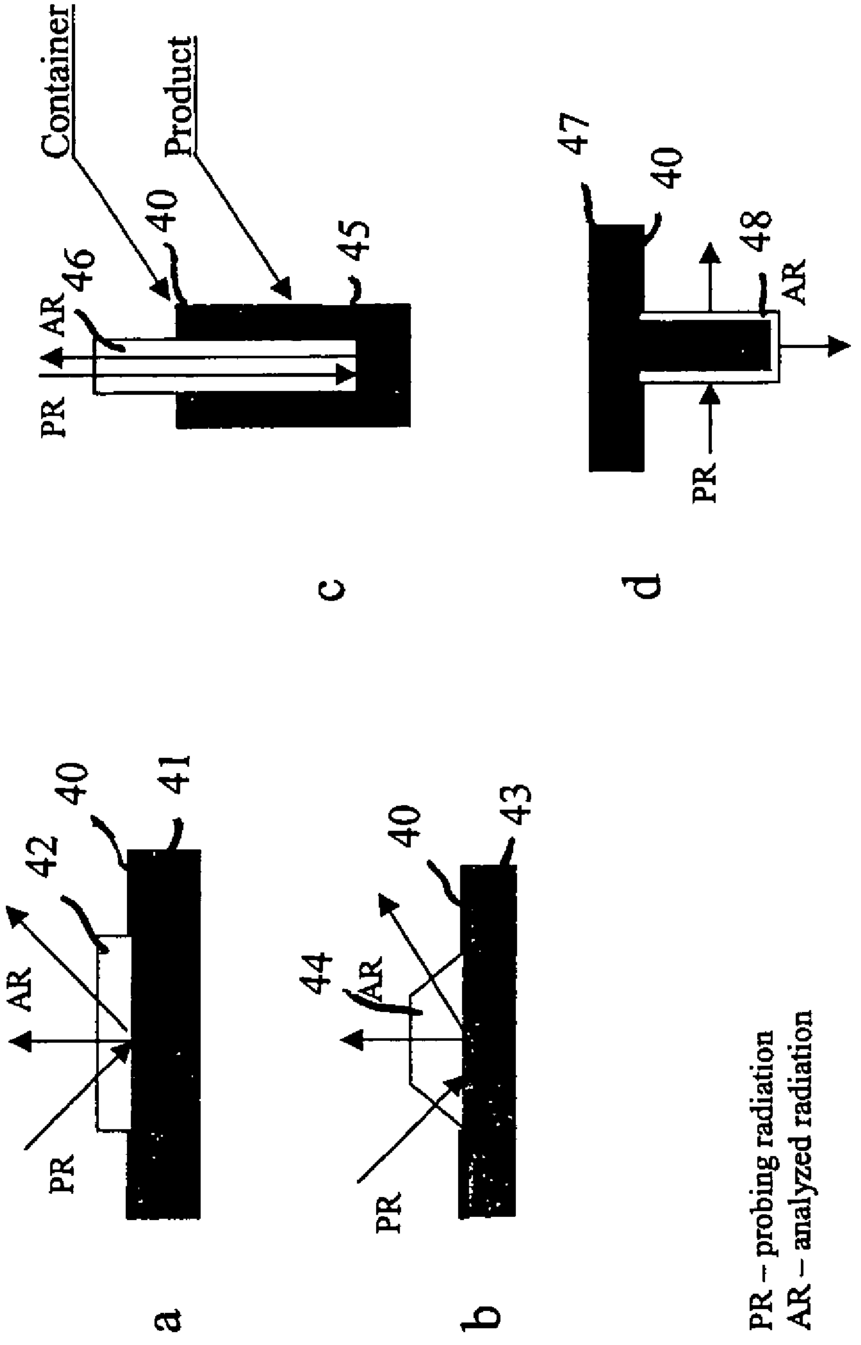

FIG. 4 is a diagram of optical devices for delivering probing optical radiation (PR) and collecting the analyzed optical radiation (AR), which permit contactless nondestructive analysis of the product's optical response:

FIG. 4*a*) shows a window made of a material transparent in the spectral band of the probing and analyzed radiation;

FIG. 4*b*) shows a prism made of a material transparent in the spectral band of the probing and analyzed radiation.

FIG. 4*c*) shows a wave guide made of a material transparent in the spectral band of the probing and analyzed radiation;

FIG. 4*d*) shows an optical cell made of a material transparent in the spectral band of the probing and analyzed radiation.

Figure 5:
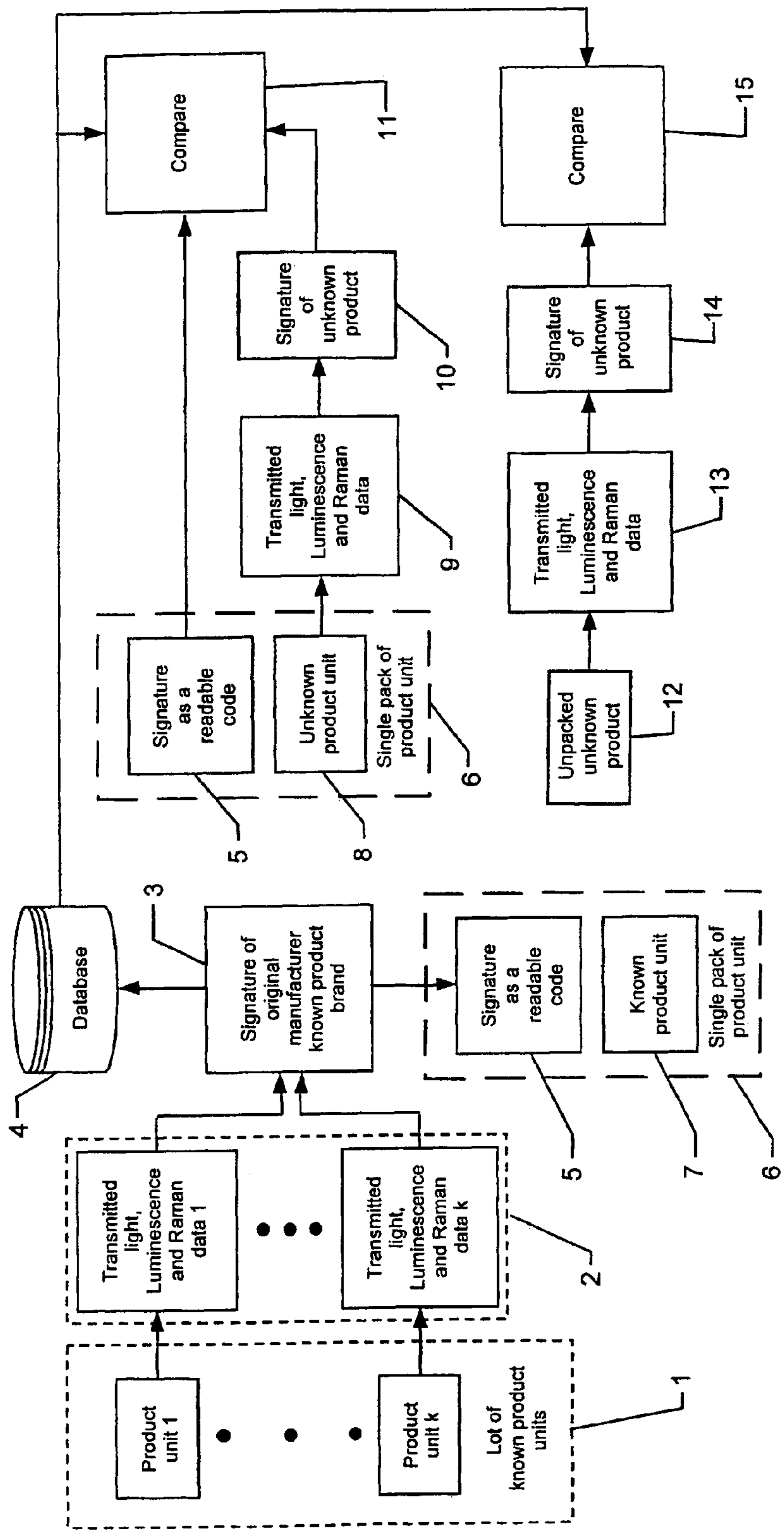

FIG. 5 is a data flow diagram.

DETAILED DESCRIPTION OF THE INVENTION

The application of bar codes is one of the most effective modern methods of product labeling and protection. A bar code reflects the universal identification number of a manufacturer's product and enables trading partners throughout the product distribution chain to perform product identification in the fastest, most accurate and least expensive manner [Universal Product Code (UPC) and EAN Article Numbering Code (EAN):

www.adams1.com/pub/russadam/upccode.html]. This is made possible by the insignificance of the identification number. In other words, the information about the product's qualitative and quantitative characteristics is contained and supported in a database and is not included in the number itself. The technology proposed in the present invention provides such a possibility of acquiring and documenting the information about a product's qualitative and quantitative characteristics.

The physical essence of the claimed technology of card-generation and product inspection is based on the analysis of peculiarities of interaction of the analyzed product with optical radiation. Almost all product components contribute to that interaction, including microimpurities that are present in negligible amounts ($10^{-5}$–$10^{-9}$ g/l) and capable of absorbing and re-emitting optical radiation.

The result of such interaction (the product's generalized optical image) is recorded by a special apparatus as a multidimensional matrix which is formed from profiles of the spectral dependencies of transmittance, luminescence intensity and Raman scattering of the light emitted by the inspected specimen. The multidimensional optical image is unique in representing not only the component (molecular) composition of the product but also its supramolecular structure, which is determined by technological production methods. Like a fingerprint, such a set of parameters is unique to each lot of products made from the same raw materials under identical technological conditions. The "fingerprint" thus obtained is actually a card that unambiguously reflects the product's composition. That information can be presented as a graphic or digital document affixed directly to the container of the characterized product and/or stored in a centralized database. Since that document is specific exclusively to the composition of that product, it cannot be forged.

Such a card is an intrinsic supplement to the existing bar-coding technologies that provide standard methods of addressing the electronic databases corresponding to the specific inspected product. On the other hand, the analytical data of the optical image that are on the product's container and/or in the product documentation and in the corresponding database, improve the protection of both the original container and the protective bar codes that characterize the product's authenticity.

The procedure of generating the generalized optical images used for card generation and product inspection does not require any preliminary sample preparation, which provides reliable reproducibility of the analytical data and guarantees a high level of confidence in determining the product's authenticity.

The present invention thus provides a process for product card generation, labeling, inspection and/or authentication, which consists of the following steps:

(I) The product card generation step, which involves the following:

(a) a representative series of k randomly selected units (containers) of goods is sampled from a homonymous lot of products of a specific brand manufactured in a single technological cycle from identical raw materials and/or intermediates, where k is the number of product units selected;

(b) a sample specimen is taken from each product unit in the amount required for analysis;

(c) each of the k sample specimens is successively irradiated with monochromatic light at selected wavelengths $\lambda_1, \lambda_2, \ldots \lambda_n$ isolated from the emission spectrum of the light source in the spectral band $\lambda_i$, including the step of splitting the source's light into spectral components and/or isolating specified segments with a bandwidth $\Delta_i$ from that source's light, thus making it possible to change the spectral position of those segments with a specified increment of $\Delta\lambda_i \geqq \Delta_i$ and to focus the isolated monochromatic light on the specimen to be analyzed;

(d) means are provided for collecting the incident light, light transmitted through the specimen or light reflected by the specimen, as well as luminescent light and Raman scattering, in self-contained independent photodetectors;

(e) for each of the k specimens and at each of the isolated wavelengths $\lambda_1, \lambda_2, \ldots \lambda_n$ of the selected spectral band $\lambda_i$, the intensities of the probing light collected in photodetectors $I_0$, light transmitted through or reflected by the specimen $I_T$, the specimen's luminescent light $I_L$ and Raman scattering $I_R$ are measured, including the steps of splitting the luminescent light and Raman scattering into numerous spectral segments and/or successive isolation of specified wavelength segments $\lambda_1, \lambda_2, \ldots \lambda_m$ of width $\Delta_j$ with a specified increment of $\Delta\lambda_j \geqq \Delta_j$, where each segment corresponds to a predetermined characteristic wavelength within the selected spectral band $\lambda_j$ collected and recorded by the photodetector;

(f) for each of the k sample specimens, the relative spectral distributions of intensities of the collected light transmitted through or reflected by the specimen at each of the isolated wavelengths $\lambda_n$, as well as the specimen's luminescent light and Raman scattering for each of the isolated wavelengths $\lambda_n$, $\lambda_m$, are determined:

$$T^k(\lambda_n) = \frac{I_T^k(\lambda_n)}{I_0^k(\lambda_n)};\ L^k(\lambda_n, \lambda_m) = \frac{I_L^k(\lambda_n, \lambda_m)}{I_0^k(\lambda_n)};\ R^k(\lambda_n, \lambda_m) = \frac{I_R^k(\lambda_n, \lambda_m)}{I_0^k(\lambda_n)};$$

where $I_T^k(\lambda_n)$ is the intensity of the light transmitted through or reflected by the k-th specimen measured within the specified segments $\lambda_1, \lambda_2, \ldots \lambda_n$ of the isolated incident light wavelength range $\lambda_i$;

$I_L^k(\lambda_n, \lambda_m)$is the intensity of the luminescence measured for the k-th specimen within the specified segments $\lambda_1, \lambda_2, \ldots \lambda_m$ of the isolated wavelength range $\lambda_j$ when excited by light within the specified segments $\lambda_i, \lambda_2, \ldots \lambda_n$ of the isolated wavelength range $\lambda_i$;

$I_R^k(\lambda_n, \lambda_m)$is the intensity of Raman scattering measured for the k-th specimen within the specified segments $\lambda_i, \lambda_2, \ldots \lambda_m$ of the isolated wavelength range $\lambda_j$ when excited by light within the specified segments $\lambda_1, \lambda_2, \ldots \lambda_n$ of the isolated wavelength range $\lambda_i$;

$I_0^k(\lambda_n)$is the intensity of the probing irradiation incident on the corresponding specimens at the time of measurement;

(g) for each of the k specimens, a multidimensional matrix $\|S\|_k$ generated, consisting of spectral dependencies or profiles of the intensities of the light transmitted through or reflected by the specimen, the specimen-emitted luminescent light and Raman scattering; this matrix is an electronic optical image (card, signature) of the specimen and it defines the ratio of relative intensities of the collected light transmitted through or reflected by the specimen at each of the isolated wavelengths $\lambda_n$, as well as the intensity of the luminescent light and Raman scattering at each of the isolated wavelengths $\lambda_n$,$\lambda_m$:

$$\|S\|_k = \begin{Vmatrix} T_1^k & L_{1,1}^k & \cdots & L_{1,n}^k & R_{1,n}^k \\ \cdots & \cdots & \cdots & \cdots & \cdots \\ T_m^k & L_{m,1}^k & \cdots & L_{m,n}^k & R_{m,n}^k \end{Vmatrix},$$

where $T^k(\lambda_n)$ is the intensity of the light transmitted through or reflected by the k-th specimen at wavelength $\lambda_1, \lambda_2, \ldots \lambda_n$, normalized for the intensity of the incident radiation at the corresponding wavelength;

$L^k(\lambda_n,\lambda_m)$ is the intensity of the luminescent light emitted by the specimen in the specified segments $\lambda_1, \lambda_2, \ldots \lambda_m$ of the isolated wavelength range $\lambda_j$ when excited by light in the specified segments $\lambda_1, \lambda_2, \ldots \lambda_n$ of the isolated wavelength range $\lambda_i$, normalized for the intensity of the incident radiation at the corresponding wavelength;

$R^k(\lambda_n, \lambda_m)$ is the intensity of the specimen's Raman scattering in the specified segments $\lambda_1, \lambda_2, \ldots \lambda_m$ of the isolated wavelength range $\lambda_j$ when excited by light in the specified segments $\lambda_1, \lambda_2, \ldots \lambda_n$ of the isolated wavelength range $\lambda_i$, normalized for the intensity of the incident radiation at the corresponding wavelength;

(h) a generalized optical image of the integrated component composition is formed for the product's commercial lot being characterized; this image is defined as the arithmetical mean of the k individual matrices $\|S\|_k$ according to the expression:

$$\|\overline{S}\| = \left( \frac{\sum_{k=1}^{k} \|S\|_k}{k} \right) \pm \delta,$$

where ±δ is the magnitude of the error caused by fluctuations in the product's average component composition within the technological lot, and is defined by maximum deviations of the generalized optical images of individual specimens from the average image:

$$\delta = \frac{1}{s} \times \sum_s \left[ \left( \frac{\|S\|_k}{\int\int_{m,n} (\|S\|_k) d\lambda_i, \lambda_j} - \frac{\|\overline{S}\|_k}{\int\int_{m,n} (\|\overline{S}\|_k) d\lambda_i, \lambda_j} \right) \times \frac{1}{\|\overline{S}\|} \right],$$

where $$\sum_s$$

is the summation of values of all elements or cells in the resulting matrix; and s is the total number of elements or cells in the matrix;

(i) the generalized optical image of the characterized commercial product lot $\|\overline{S}\|$ is converted to digital format and entered in a computer database and/or stored on intermediate media;

(II) The product labeling step, in which the generalized optical image of the characterized commercial product lot $\|\overline{S}\|$, represented in a digital, graphic, holographic or other format that can be read by special devices and/or used for visual comparison, is printed directly on the product's container and/or in the product documentation;

(III) The product inspection and/or authentication step:

(a) a sample amount required for analysis is taken from the available amount (container) I of the product being inspected;

(b) the sample i being inspected is illuminated with light at the isolated wavelengths, and operations identical to steps (I–c) through (I–f) are performed;

(c) an optical image of the specimen being inspected is generated as a multidimensional matrix $\|S\|_i$ consisting of spectral dependencies or profiles of the intensities of the light transmitted through or reflected by the specimen, the specimen-emitted Raman scattering and luminescent light as in step I(g);

(d) a graphical image of the matrix $\|S\|_i$ of the specimen being inspected is generated in coordinates identical to those shown on the container and/or in the product documentation;

(e) the graphical representation of the matrix $\|S\|_i$ of the specimen being inspected is compared with the graphic representation of the product's image $\|\overline{S}\|$ shown on the container and/or in the product documentation, and the specimen being inspected is recognized as authentic when the compared graphical images agree completely;

(f) the electronic digital image of the specimen being inspected, represented by the digital form of the matrix $\|S\|_i$, is compared with the digital image of the product's matrix $\|\bar{S}\|$ stored in the database using the expression:

$$A = 1 - \frac{1}{s} \times \sum_{s} \left[ \left( \frac{\|S\|_i}{\iint_{m,n} (\|S\|_i) d\lambda_i, \lambda_j} - \frac{\|\bar{S}\|}{\iint_{m,n} (\|\bar{S}\|) d\lambda_i, \lambda_j} \right) \times \frac{1}{\|\bar{S}\|} \right],$$

and the specimen being inspected is recognized as authentic when $A=1\pm\delta$.

In one embodiment of the invention the parameters of the specimens being inspected are measured by a contactless method, excluding the step of taking samples from individual commercial containers. In this method the products are packaged in containers made or a material is which transparent in the spectral bands of both the probing radiation and the analyzed radiation. This makes it possible to assay directly for samples of packaged products without damaging the containers, as the probing radiation interacts with the analyzed product in the container and the analyzed radiation that contains the characteristic response of the specimen to the optical action can exit unimpeded.

In another embodiment of the present invention, the container is equipped with a window made of a material transparent in the spectral band of the probing and the analyzed radiation. This transparent window is built into any part of the product's container, thus permitting the probing radiation to interact with the analyzed product in the container, and the analyzed radiation to exit the container unimpeded.

In another embodiment of the present invention, the product container includes a prism made of a material transparent in the spectral band of the probing and analyzed radiation. This prism can be built into any part of the product's container.

In yet another embodiment of the present invention, the product container includes a wave guide made of a material transparent in the spectral band of the probing and analyzed radiation. This prism can be built into any part of the product container.

In yet another embodiment of the present invention, the product container contains a cell made of a material transparent in the spectral band of the probing and analyzed radiation. This cell can be built into any part of the product's container.

The radiation-transparent sections of the packages described above may differ in geometrical configurations and dimensions in order to optimize the entry and interaction of the probing radiation when products are analyzed.

FIG. 4 illustrates how packages with different types of radiation-transparent sections can be sampled to ascertain the authenticity of the product.

FIG. 4*a* shows a container 40 containing a product 41. The container 40 is equipped with a transparent window 42 through which probing radiation PR and analyzed radiation AR can travel.

FIG. 4*b* shows a container 40 contain a product 43. This container 40 is equipped with a prism 44 through which probing radiation PR and analyzed radiation AR can travel.

FIG. 4*c* illustrates a container 40 containing a product 45 in which the container 40 is equipped with a wave guide 46. Probing radiation PR and analyzed radiation AR freely traverse this wave guide.

FIG. 4*d* illustrates a container 40 containing a product 47. This container 40 is equipped with an optical cell 48 which the probing radiation PR and the analyzed radiation AR freely traverse the optical cell.

The present invention can be described in more detail using the following nonlimiting examples:

FIG. 5 is a data flow diagram representing the overall processing steps of the present invention. For a representative series of randomly selected units of one homonymous lot of products (1), measurements are taken of spectral distributions of intensities of the light transmitted through or reflected by the specimen, as well as the specimen's luminescent light and Raman scattering values (2). Based upon measurement values, a signature (3) is produced for the batch of the known product of the known product specific brand of original manufacturer. This signature is entered into a data base (4) and, in the form of an easily readable cod (5), is allocated to a commercial package (6) of each unit of the product (7).

To check the authenticity of an unknown product (8). Packed in a container (6) with a card bearing the signature of the original manufacturer (5), measurements are taken of spectral distributions of the intensity of the light transmitted through or reflected by the specimen, as well as the specimen's luminescent light and Raman scattering values (9) for the product contained in the package and the signature for this product produced (10).

Then a comparison is made (11) the signature of the package contents (10) is compared with the signature read from the code allocated to the package (5) and the signature read from the database. If the signatures (5) and (10) match, this indicates that the product in the package explicitly corresponds to the product indicated on the package. Matching of all three signatures (4, 5, and 10) clearly guarantees that authenticity of the examined product and explicitly provides the affinity of the tested product with the trademark carried by the product. Matching of the above mentioned signatures also guarantees that the examined product contains no alien admixtures, including those that are potentially dangerous.

When it is necessary to examine the authenticity of an unknown product specimen that has no package and/or is not marked with a specific signature, the measurement is carried out of spectral distributions of intensities of the light transmitted through or reflected by the specimen, as well as the specimen's luminescent light and Raman scattering values (13) of the product specimens (12). The signature produced upon these data (14) is compared with signatures from the database (4) . Based upon comparative results (15), f conclusion is made about the conformity of the examined product to a known lot of a specific manufacturer.

EXAMPLE 1

Figure 1:
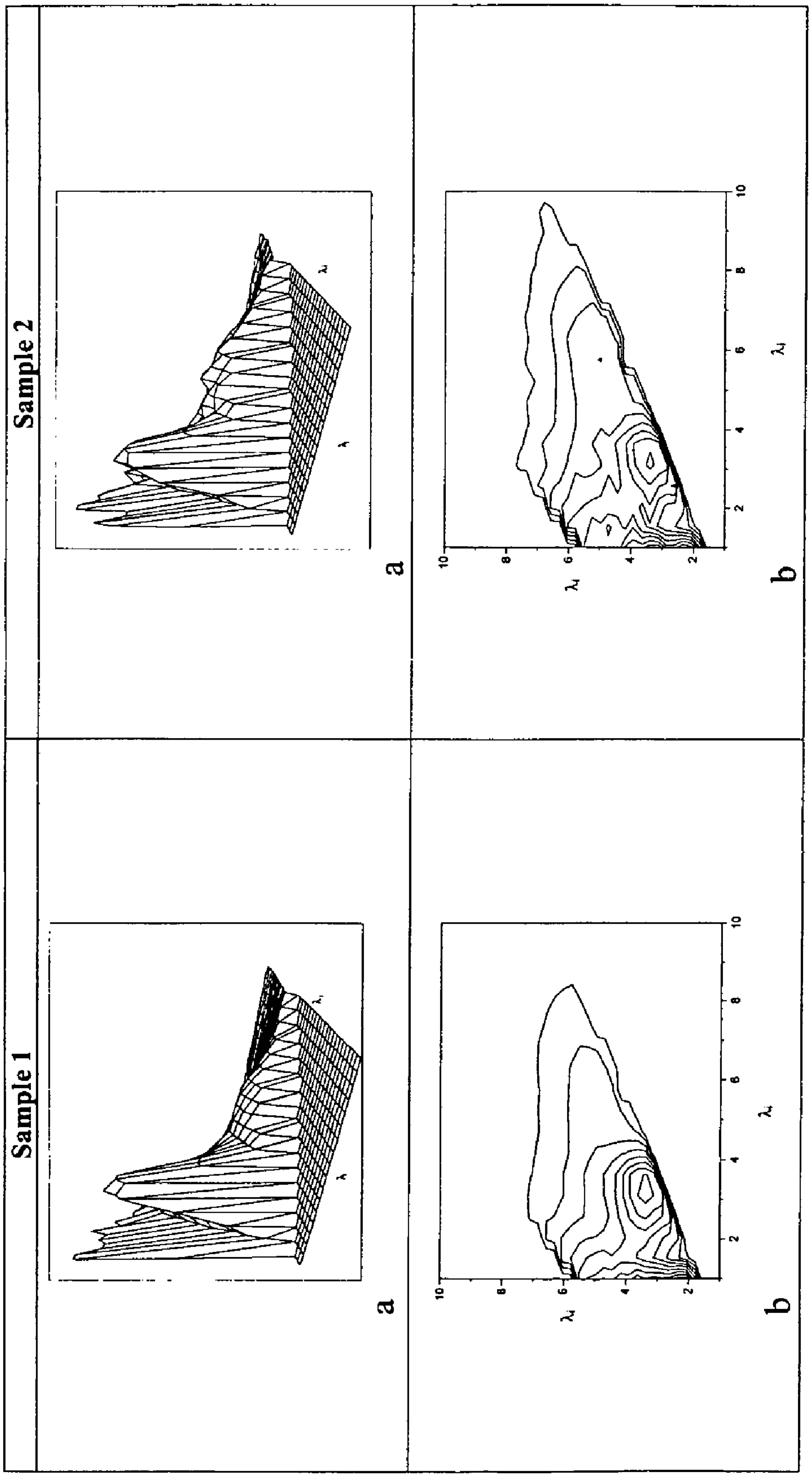
FIG. 1 is a graphic of generalized optical images of two samples of the same brand of mineral water produced by different manufacturers.

In order to demonstrate the sensitivity of the proposed method to variations in the micro-component composition of the products, FIGS. 1 and 2 show graphic presentations of the generalized optical images of various products of natural and industrial origin.

FIG. 1 shows graphic presentations of the generalized optical images as a 3D image ("portrait") and a "fingerprint," which is a topographical cross-section (a horizontal projection of the family of equidistant cross-sections of the 3D image) for two samples of mineral water of the same type supplied by different manufacturers. As can be seen from the figure, the specimens have generally similar 3D images but, at the same time, they drastically differ in details, which is especially noticeable in graphic images presented as "fingerprints."

FIG. 2 shows "fingerprints" for various type of industrial products: an alcohol product (vodka) of two identical brands produced by different manufacturers and automotive gasolines of various brands. The figure clearly shows not only the difference between optical images for different brands of homonymous products but also a drastic difference between optical images for one and the same brand of same-type products supplied by different manufacturers.

EXAMPLE 2

In order to demonstrate the average experimental values of the level of agreement and magnitude of error for the characteristic generalized optical images obtained for individual commercial lots of various goods, the following products were selected:

1)—brand 1 automotive gasoline; 2)—brand 2 automotive gasoline; 3)—mineral water; 4)—alcoholic beverage (vodka); 5)—bakery yeast (powder); 6)—shampoo (gel); 7)—dish detergent (gel); 8)—powdered laundry detergent.

Analyses were conducted for series consisting of 5–10 specimens of each type of the above products manufactured in one and the same technological cycle. The results of those analyses are presented in Table 1. As that table shows, the magnitude of error δ was several percentage points and practically all of it was determined by the experimental error of measuring the characteristic intensities

TABLE 1

| | Category of product | | | | | | | |
|---|---|---|---|---|---|---|---|---|
| | Gasoline | | Foodstuffs | | | Chemicals | | |
| | 1 | 2 | 3 | 4 | 5 | 6 | 7 | 8 |
| A | 0.96 | 0.95 | 0.95 | 0.98 | 0.94 | 0.97 | 0.98 | 0.94 |
| ±δ | 0.04 | 0.05 | 0.05 | 0.02 | 0.06 | 0.03 | 0.02 | 0.06 |

EXAMPLE 3

In order to demonstrate the levels of agreement for the optical images of homonymous products from an individual manufacturer, three specimens of shampoo of the same brand were sampled; the shampoos were produced in various technological cycles with a time interval of several months. The results of comparison are presented in Table 2. As can be seen from that table, only insignificant variations in the level of agreement due to random measurement errors were observed in products made of identical raw materials in one and the same technological cycle. On the other hand, the level of agreement was substantially lower in specimens from different technological lots.

TABLE 2

| | | Lot 1 | | | Lot 2 | | |
|---|---|---|---|---|---|---|---|
| | | 1-1 | 1-2 | 1-3 | 2-1 | 2-2 | 2-3 |
| Lot 1 | 1-1 | 1 | 0.97 | 0.95 | 0.82 | 0.79 | 0.82 |
| | 1-2 | 0.97 | 1 | 0.98 | 0.86 | 0.85 | 0.8 |
| | 1-3 | 0.95 | 0.98 | 1 | 0.88 | 0.82 | 0.85 |
| Lot 2 | 2-1 | 0.82 | 0.86 | 0.88 | 1 | 0.94 | 0.99 |
| | 2-2 | 0.79 | 0.85 | 0.82 | 0.94 | 1 | 0.96 |
| | 2-3 | 0.82 | 0.8 | 0.85 | 0.99 | 0.96 | 1 |

EXAMPLE 4

FIG. 3 illustrates the detection of counterfeit industrial products using generalized optical images. FIG. 3-*a* shows graphic 3D images of a dish detergent made according to the original technology of a well known company and its counterfeits made by two different manufacturers (FIG. 3-*b, c*). The level of agreement of the electronic images for those specimens is presented in Table 3.

As the figure shows, the 3D images of the counterfeits drastically differ from those of the brand products even by mere visual comparison. The results of comparison of electronic images presented in Table 3 show that brand product specimens, within a single technological lot (specimens a-1.1 and a-1.2), are practically identical in composition. Even in different commercial lots of the brand products, the differences in the level of agreement do not exceed 10%. Counterfeits of the homonymous counterfeiting manufacturers are also very similar to one another (cf. b-1 and b-2, c-1 and c-2) but drastically differ from the brand products. On the other hand, counterfeits made by different manufacturers strongly differ from one another, too (cf. b-1 and c-1).

TABLE 3

| | Original product | | | Counterfeit product | | | |
|---|---|---|---|---|---|---|---|
| | Lot 1 | | Lot 2 | Manufacture 1 | | Manufacture 2 | |
| | a-1.1 | a-1.2 | a-2 | b-1 | b-2 | c-1 | c-2 |
| a-1.1 | 1.0 | 1.0 | 0.88 | 0.42 | 0.45 | 0.23 | 0.2 |
| a-1.2 | 1.0 | 1.0 | 0.88 | 0.42 | 0.45 | 0.23 | 0.2 |
| a-2 | 0.88 | 0.88 | 1.0 | 0.45 | 0.5 | 0.28 | 0.25 |
| b-1 | 0.42 | 0.42 | 0.45 | 1.0 | 0.9 | 0.2 | — |
| b-2 | 0.45 | 0.45 | 0.5 | 0.9 | 1.0 | — | — |
| c-1 | 0.23 | 0.23 | 0.28 | 0.2 | — | 1.0 | 0.92 |
| c-2 | 0.2 | 0.2 | 0.25 | — | — | 0.92 | 1.0 |

EXAMPLE 5

FIG. 4 shows some of the options for implementing optical devices that permit contactless card generation and/or product inspection directly in commercial containers without damaging those containers.

The signature of the known product obtained as described above can be used to generate a readable code, such as a digital code, graphic code, magnetic code, or holographic code. These codes can be made into cards that can be read by special devices and/or by visual comparison. The code is listed in the product documentation, or printed directly onto the product's container. The product is packaged in a package made at least partly of a material which is transparent to the spectral band of the probing and the analyzed radiation so that the image obtained from probing with radiation can be compared with the code or card listed in the product documentation or printed directly on the product's container.

The foregoing description of the specific embodiments will so fully reveal the general nature of the invention that others can, by applying current knowledge, readily modify and/or adapt for various applications such specific embodiments without undue experimentation and without departing from the generic concept. Therefore, such adaptations and modifications should and are intended to be comprehended within the meaning and range of equivalents of the disclosed embodiments.

It is to be understood that the phraseology or terminology employed herein is for the purpose of description and not of limitation. The means and materials for carrying out various disclosed functions may take a variety of alternative forms without departing from the invention.

Thus, the expressions "means to . . . " and "means for . . . " as may be found in the specification above and/or in the claims below, followed by a functional statement, are intended to define and cover whatever structural, physical, chemical, or electrical element or structures which may now or in the future exist for carrying out the recited function, whether or nor precisely equivalent to the embodiment or embodiments disclosed in the specification above. It is intended that such expressions be given their broadest interpretation.

What is claimed is:

1. A method for authenticating products comprising:

a. sampling a representative series of randomly selected units of known products from a homonymous lot of known products manufactured in a single production cycle from identical raw materials and optional intermediates;

b. obtaining light transmitted, luminescent and Raman scattering values for the series of known products to produce a signature for the known product;

c. sampling an unknown product to obtain light transmitted, luminescent and Raman scattering values for the unknown product to produce a signature for the unknown product; and d. comparing the signature of the known product and the unknown product to determine if the signature of the unknown product is the same as the known product.

2. The method according to claim 1 wherein the unknown product is packaged in a container at least partially constructed of a material which is transparent to a spectral band selected from the group consisting of light transmission, luminescence and Raman scattering.

3. The method according to claim 2 wherein the container includes a window made of material transparent to the spectral band of probing reaction and the spectral band of analyzed radiation.

4. The method according to claim 2 wherein the container includes a prism made of a material transparent to the spectral band of probing reaction and the spectral band of analyzed radiation.

5. The method according to claim 2 wherein the container includes a wave guide transparent to the spectral band of probing reaction and the spectral band of analyzed radiation.

6. The method according to claim 2 wherein the container includes a cell transparent to the spectral band of probing reaction and the spectral band of analyzed radiation.

7. The method according to claim 1 wherein the signature of the known product is presented as a code that can be read.

8. The method according to claim 7 wherein the code is selected from the group consisting of digital codes, magnetic codes, holographic codes, and graphic codes.

9. The method according to claim 7 wherein the product is packaged in a container equipped with a card bearing the signature of the known product.

10. The method according to claim 1 wherein the known product is selected from the group consisting of products and/or materials that contain components absorbing and/or emitting light radiation.

* * * * *